2 Sheets--Sheet 1.

G. LOWDEN.

Improvement in Treadles for Sewing and other Machines.

No. 131,359.            Patented Sep. 17, 1872.

WITNESSES:

INVENTOR:

2 Sheets--Sheet 2.

G. LOWDEN.
Improvement in Treadles for Sewing and other Machines.

No. 131,359. Patented Sep. 17, 1872.

WITNESSES:

INVENTOR:
George Lowden

UNITED STATES PATENT OFFICE.

GEORGE LOWDEN, OF BROOKLYN, NEW YORK.

IMPROVEMENT IN TREADLES FOR SEWING AND OTHER MACHINES.

Specification forming part of Letters Patent No. 131,359, dated September 17, 1872.

*To all whom it may concern:*

Be it known that I, GEORGE LOWDEN, of the city of Brooklyn, in the county of Kings and State of New York, have invented a certain new and useful device for converting the vertical into the rotatory motion for operating sewing-machines, lathes, or revolving shafting of any kind where the crank movement is used; and I hereby declare the following to be a full, clear, and exact description thereof, reference being had to the accompanying drawing, which is lettered to correspond with and form a part of the specification.

Figure 1:
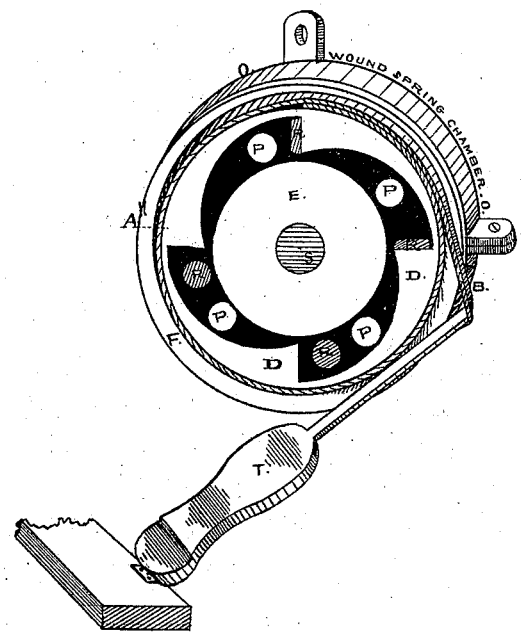
Figure 3:
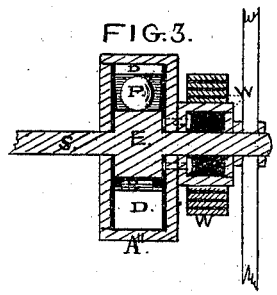

To enable the public to understand the nature of my said invention, and those skilled in the mechanic arts to construct and operate the same, I will describe it as follows, to wit:

Figure 1 is a side or face elevation of a cast-metal drum, A, provided with a series of teeth or clutches cast or otherwise formed upon the inner surface thereof, the same being constructed by four segments of the same circle, having four centers at right angles to the center of the shaft S, which is cast or otherwise formed with an enlargement, E, having a smooth horizontal bearing, as shown at Fig. 3, Plate 2, and revolving inside of the toothed arm A, to receive and be operated by the series of self-adjusting rollers or balls P P P P, operating in the curved wedge-shaped cavities formed by the inner surface of the teeth or clutches D D D, and the outer periphery of the enlargement E upon the shaft S. These self-acting rigid rollers or balls P P P P when set free roll in contact with the flexible pads or rollers R R R and thus prevent noise.

Figure 2:
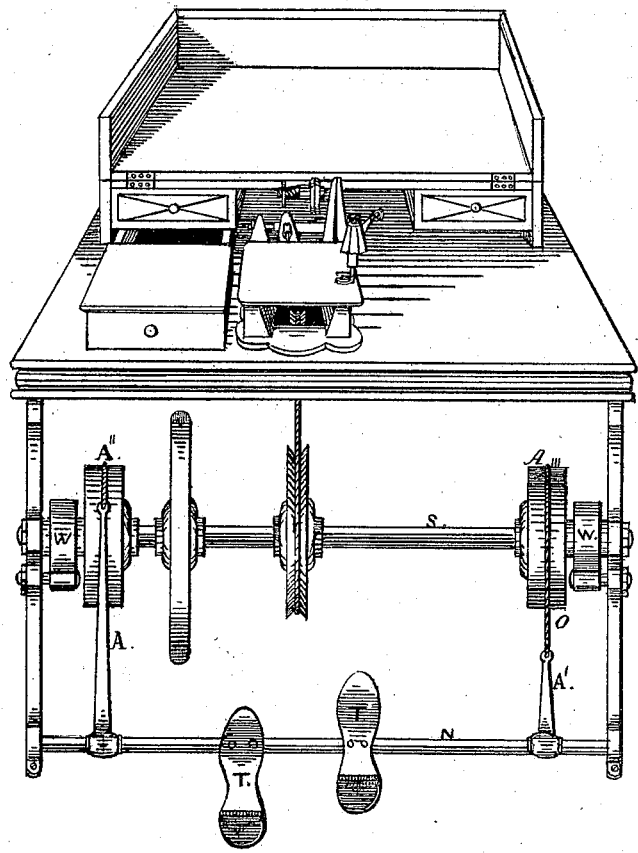

Fig. 2 is a front and perspective top view of a sewing-machine having my improved oscillating device arranged upon each end of the main shaft S for the purpose of obtaining a greater amount of power and uniformity of motion than could be obtained by the use of a single oscillating drum A alone, when alternately operated by the combined action of the treadle and arm T, leather or other flexible band B passing once and a third times, more or less, around the single cylindrical drum A. (See Fig. 1.)

Fig. 3, A″, is a transverse vertical section of Fig. 1, showing the best manner of constructing the enlargement E upon the shaft S to receive the metallic balls P P P P, also showing the rubber balls or pads R in the recess or openings between the teeth or clutches D D D, and the enlargement E, with the mode of securing the flat spring-reel W to the vertical side of the drum A″, so that the action of the wound spring around said reel will cause the oscillating drum to rotate in one direction only, while the band B and treadle T, Fig. 1, will act upon the single oscillating drum in the same direction, so that an easy uniform bearing is effected upon the entire surface of the circular bearing of the enlargement E, by which means a uniform rotary motion is given to the driving or main shaft S by means of a series of independent metallic balls, P, operating in the several cavities of the different clutches inside of the drum A, formed, as aforesaid, from different centers, as shown at Fig. 1.

I am aware that two loose hubs, united together and provided with crank-arms, so that the same may be attached to and worked by connecting-rods at the same point of action upon the driving-shaft of a sewing-machine, are in common use; I am also aware that loose sectional hubs, having a single roller operating by means of a spiral spring in the cavity of a single clutch formed in one of the "crank-arm" sections of said loose hubs, have long been used for the ostensible purpose set forth; therefore I disclaim all of the above devices when operated by connecting bars and cranks of any kind, particularly when arranged, combined, and operating as set forth and claimed in Charles L. Spencer's patent, bearing date September 29, 1863; but the novelty of my invention consists in the construction of the shaft S with an enlargement, E, operating inside of the oscillating drum A. Secondly, a cylindrical drum with projecting curved teeth D D D, cast in one piece, without crank-arms of any kind, and provided with a number of cavities to receive and grasp the friction balls or rollers P P P P, to produce the required friction upon the entire bearing-surface of the enlargement E of the shaft S, to operate the same by means of a single leather strap or other flexible band, B, secured to and passing over the loose pulley or drum A, to operate, alternately, with the wound broad flat spring and reel W, in combination with the treadle and arm T, whether the same is united or otherwise arranged, as shown in the drawing; therefore,

What I claim as new and useful, and wish to protect by Letters Patent of the United States, is—

The oscillating drums A A″, provided with friction-clutches D D, fly-wheel, and spring-drums, the latter upon the extremities of the shaft and rigidly secured to the frame, the whole operated by means of treadles T connected with the operating mechanism by means of straps B, substantially as and for the purpose set forth.

In testimony whereof I hereunto subscribe my name in the presence of two witnesses.

GEORGE LOWDEN.

Witnesses:
WILLIAM RIPTON,
J. P. MACLEAN.